United States Patent
Piccinini et al.

(10) Patent No.: US 9,749,272 B2
(45) Date of Patent: Aug. 29, 2017

(54) CONTEXT-DEPENDENT MESSAGE MANAGEMENT

(71) Applicant: International Business Machines Corporation, Armonk, NY (US)

(72) Inventors: Sandro Piccinini, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 14/633,223

(22) Filed: Feb. 27, 2015

(65) Prior Publication Data

US 2016/0255166 A1 Sep. 1, 2016

(51) Int. Cl.
  *G06F 15/16* (2006.01)
  *H04L 12/58* (2006.01)
  *H04L 29/08* (2006.01)

(52) U.S. Cl.
  CPC .............. *H04L 51/14* (2013.01); *H04L 51/22* (2013.01); *H04L 67/24* (2013.01); *H04L 51/043* (2013.01)

(58) Field of Classification Search
  CPC ......... H04L 67/28; H04L 51/14; H04L 51/22; H04L 67/24; H04L 51/043
  See application file for complete search history.

(56) References Cited

U.S. PATENT DOCUMENTS

| | | |
|---|---|---|
| 7,295,657 B1 | 11/2007 | Keohane et al. |
| 8,280,965 B2 | 10/2012 | DellaFera et al. |
| 2007/0130464 A1* | 6/2007 | Swedor ............... H04L 63/0442 713/170 |
| 2008/0104175 A1 | 5/2008 | Keohane et al. |
| 2008/0104177 A1* | 5/2008 | Keohane ............... G06Q 10/107 709/206 |
| 2009/0150500 A1 | 6/2009 | Kumar et al. |
| 2010/0198921 A1 | 8/2010 | Choi et al. |

(Continued)

OTHER PUBLICATIONS

Piccinini et al., "Context-Dependent Message Management", U.S. Appl. No. 14/844,054, filed Sep. 3, 2015, pp. 1-27.

(Continued)

*Primary Examiner* — Krisna Lim
(74) *Attorney, Agent, or Firm* — James H. Mayfield

(57) ABSTRACT

A method, executed by a computer, for context-dependent message management, includes receiving proxy recipient information from a target recipient, detecting that a message is being drafted to the target recipient while the target recipient is unavailable, and suggesting a proxy recipient in place of the target recipient. The proxy recipient information may identify multiple proxy recipients organized according to message topic. The proxy recipient information may also describe one or more topics for which a target recipient is available and/or suitable. Proxy recipient information may be determined automatically or may be provided by a user. Furthermore, the proxy recipient information may include availability information. In one embodiment, a user approves of the proxy recipient prior to transmitting the message. In another embodiment, the target recipient is able to preemptively receive the message. A computer system and computer program product corresponding to the above method are also disclosed herein.

16 Claims, 6 Drawing Sheets

(56) References Cited

U.S. PATENT DOCUMENTS

2013/0067000 A1 3/2013 Brauninger et al.
2014/0330910 A1* 11/2014 Anderson ............... H04L 51/04
 709/206

OTHER PUBLICATIONS

IBM Appendix P, list of IBM patents or patent applications treated as related, Sep. 3, 2015, pp. 1-2.

Disclosed Anonymously et al., "Method and system for collaborative mail management", An IP.com Prior Art Database Technical Disclosure, IP.com No. 000220082, Jul. 20, 2012, pp. 1-3.

Disclosed Anonymously et al., "Method for Providing Confirmed Backup Availability Across Collaboration Tools", An IP.com Prior Art Database Technical Disclosure, IP.com No. 000205091, Mar. 14, 2011, pp. 1-2.

IBM et al., "System and Method for ":NO-DELAY": in sending the mail to backup person when primary receiver is on leave", An IP.com Prior Art Database Technical Disclosure, Aug. 4, 2008, IP.com No. 000173392, 1 page.

Outlook et al., "Auto Reply Manager", noted in Search Report dated Nov. 23, 2013, <http://www.outlook-apps.com/product/auto-reply-manager/>.

\* cited by examiner

| Topic | Keywords |
|---|---|
| Accounting | Money, payroll, pay date, pay, budget, fiscal, quarter, income, gross, finance |
| Human Resources | Hire, fire, equal opportunity, resume, job, job fair, coworker, dispute, official, reprimand |
| Marketing | advertisement, ads, projection, sales, sale, sell, specifications, specs, price, discount, coupon, campaign, affiliates |
| Operations | Asset, capacity, six sigma, quality control, transportation |
| Public Relations | image, corporation, newspaper, internet, social media |
| IT | computer, data, error, upgrade, laptop, desktop, monitor, hardware, software, operating system, antivirus |

FIG. 5

CONTEXT-DEPENDENT MESSAGE MANAGEMENT

BACKGROUND OF THE INVENTION

The present invention relates generally to messaging, and more specifically to the field of message management in the case of absent recipients.

When a sender sends a message to an absent recipient, that message may go unread until the recipient becomes available again. Any delay in addressing a message may be undesirable, especially in cases where the message is urgent or a rapid reply to the message is sought.

SUMMARY

As disclosed herein, a method, executed by a computer, for context-dependent message management includes receiving proxy recipient information from a target recipient, detecting that a message is being drafted to the target recipient while the target recipient is unavailable, and suggesting a proxy recipient in place of the target recipient. The proxy recipient information may identify multiple proxy recipients organized according to message topic. The proxy recipient information may also describe one or more topics for which a target recipient is available and/or suitable. Proxy recipient information may be determined automatically or may be provided by a user. Furthermore, the proxy recipient information may include availability information. In one embodiment, a user approves of the proxy recipient prior to transmitting the message. In some embodiments, the target recipient is able to preemptively receive the message. A computer system and computer program product corresponding to the above method are also disclosed herein.

BRIEF DESCRIPTION OF THE DRAWINGS

FIG. 5 is a user interface diagram depicting one example of a topic index interface in accordance with the present invention.

DETAILED DESCRIPTION

Embodiments of the present invention relate generally to context-dependent message management, and more specifically, to messaging when an originally intended recipient of the message, known as a "target recipient," is unavailable. In one embodiment, the unavailability of a target recipient may be overcome by suggesting an appropriate back-up, or "proxy" recipient. The proxy recipient may be selected on the basis of the subject matter or topic of the message. The types of messages may include e-mail, short message service (SMS), multimedia messaging service (MMS), or any other suitable messaging.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
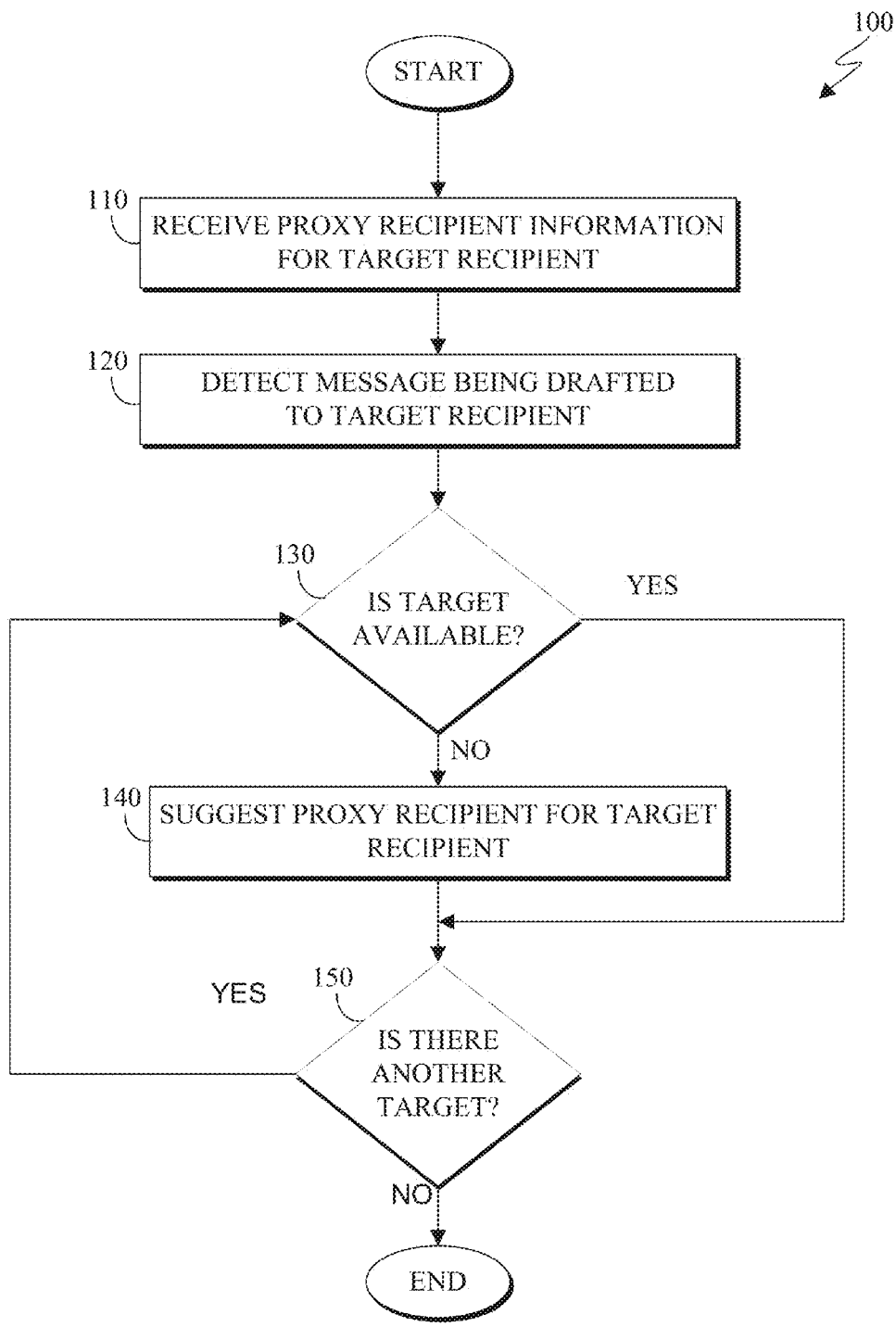
FIG. 1 is a flowchart of one embodiment of a method for messaging proxy recipients in accordance with the present invention.

The present invention will now be described in detail with reference to the Figures. FIG. 1 is a flowchart of one embodiment of a computer-implemented messaging method 100 in accordance with the present invention. As depicted, the messaging method 100 includes receiving (110) proxy recipient information for a target recipient, detecting (120) a message being drafted to a target recipient, determining availability (130) of the target, suggesting (140) an proxy recipient for the target recipient, and determining if there is another target (150). The messaging method 100 thus enables a sender to deliver a message to a proxy recipient in lieu of an absent target recipient, which may tend to decrease the amount of time that a message goes unread.

Receiving (110) proxy recipient information for a target recipient may include collecting details from a target recipient's messaging client. The messaging client may be an e-mail client, webpage executing in a browser, smartphone texting app, or the like. In one embodiment, this act of collection is mediated by a software component, such as a plug-in, add-on, or extension, which is associated with the messaging client. In some embodiments, collection may be performed by a separate program or device external to the messaging client. On a mobile platform, the proxy recipient information may be collected by an app that is installed on a mobile device.

The details that are collected from a target recipient are collectively referred to herein as "proxy recipient information." In one embodiment, the proxy recipient information is a list of proxy recipients corresponding to message topics. For example, if a topic of a message is advertising, the proxy recipient information may provide a proxy recipient who is employed in a marketing position. In some embodiments, the proxy recipient information includes the schedules or current availability of proxy recipients. The relationship between proxy recipients and message topics may be determined by a user or determined automatically by analyzing prior message history. In one embodiment, this relationship is determined by applying machine learning techniques, such as data-mining, to the message and/or message history.

Detecting (120) a message being drafted to a target recipient may include monitoring any recipient fields in the user interface of a draft message. For example, while drafting an SMS or MMS message, the user interface may contain a "to:" field, whereas an email client may contain "to:", "cc:" and/or "bcc:" fields. In some embodiments, whenever a target recipient's contact information is entered into any sort of recipient field, detection 120 occurs.

Determining availability (130) of the target may include a variety of approaches. For example, availability may be determined by checking the online status, network presence, and/or schedule of a target recipient for availability. In some embodiments, a target recipient's schedule is obtained from stored schedule data, such as a calendar or planner database, in which the target recipient's schedule was entered. The target's availability may be determined from the target's schedule or from a group schedule. For example, an office schedule that lists all members of XYZ Committee as unavailable on Tuesdays may allow for the determination that a target is unavailable given that the target is a member of XYZ Committee. "Availability" of a target may mean that the target is in a situation or location where the target is unable (or does not wish) to respond to messages. In some embodiments, a target is unavailable if the target is out of the office. If the result of the target availability decision step 130 is that a target is not available, the proxy recipient messaging method 100 proceeds to the step of suggesting (140) a proxy recipient; otherwise, the proxy recipient messaging method 100 terminates.

In some embodiments, the target's availability is a function of particular actions or inactions relating to the target's messaging device(s). If the messaging device is a computer, such as a laptop or desktop, availability may be determined by monitoring mouse movements, keyboard strokes, network activity or connectivity, hard drive activity, and/or power state. On the other hand, if the messaging device is a mobile device, availability may be determined by monitoring storage activity, lock screen status, network activity or connectivity, geographical location, power state, acceleration, velocity, and/or tilt or orientation status. For example, a target may be deemed "unavailable" if the target's messaging device is off or physically out of the office, the messaging device has been physically undisturbed for a period of time, or the messaging device is near the target's home. A target may also set his or her availability status by enabling or disabling a setting of a software component on the messaging device.

Suggesting (140) a proxy recipient for the target recipient may include providing a proxy recipient in lieu of the unavailable target recipient. In one embodiment, this replacement is performed automatically. The act of replacement may be reflected in the recipient field of the draft message; for example, "proxy recipient A" may appear in place of or in any locations of the user interface where "target recipient T" had previously been entered. In some embodiments, the proxy recipient who is suggested has been verified to be presently available. The proxy recipient may also be expected to be available before the target recipient is scheduled to be available.

In one embodiment, each proxy recipient that is suggested must be approved by the sender. The approval process may involve a user accepting the substitution of recipients. If a sender does not approve of the substitution, the message may be sent to the target recipient. In some embodiments, multiple proxy recipients are provided for each unavailable target recipient, and the sender chooses to send the message to the target recipient, one proxy recipient, a combination of multiple proxy recipients, or a combination of one or more proxy recipients as well as the target recipient.

Determining (150) if there is another target may include checking for additional target recipients of the message. If there are no more target recipients, the computer implemented proxy recipient messaging method 100 ends. If there is one or more additional target recipients, the proxy recipient messaging method 100 returns to the target availability determination operation 130. In this manner, there may be an opportunity for each target recipient to be checked for availability and replaced with a proxy recipient.

In some embodiments, the target recipient is notified that, while he was unavailable, a message originally intended for him was sent to a proxy recipient. The target recipient may choose to read the message. In one embodiment, if the target recipient elects to read the message before the proxy recipient has read the message, the target recipient may choose to retake ownership of the message, at which point the message is delivered to the target recipient. When a target recipient retakes ownership of a message, the message may also be removed from the proxy recipient's inbox, as there may no longer be a need for a proxy recipient.

Figure 2:
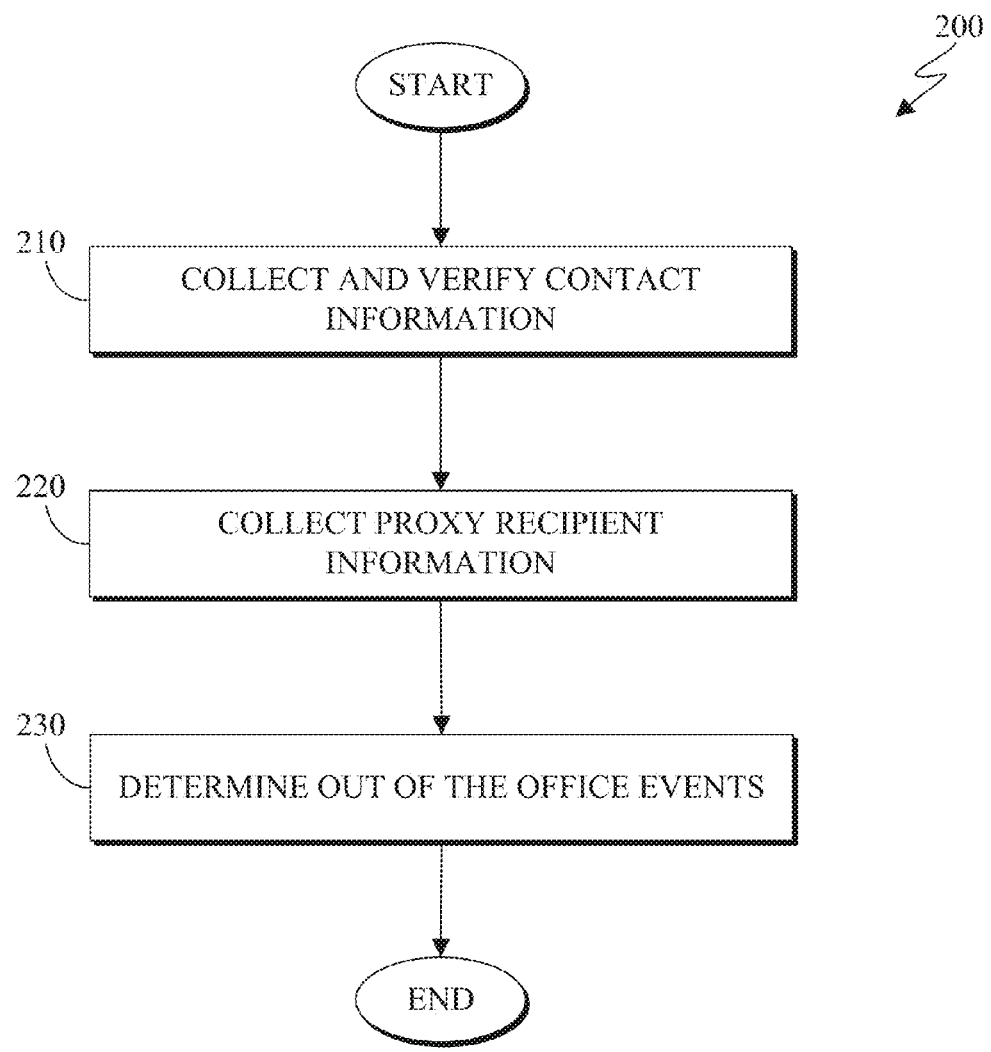
FIG. 2 is a flowchart of one embodiment of a method for enumerating out-of-the-office events in accordance with the present invention.

FIG. 2 is a flowchart of one embodiment of an out of the office (OOTO) event enumeration method 200 in accordance with the present invention. As depicted, the OOTO event enumeration method 200 includes collecting and verifying (210) contact information, collecting (220) proxy recipient information, and determining (230) OOTO events. In one embodiment, an OOTO event occurs whenever a recipient is unavailable, does not wish to be disturbed, or is otherwise unable to respond to messages.

Collecting and verifying (210) contact information may include gathering information such as a user's contact address. A user's contact address may include an email address, phone number, username, or the like. In some embodiments, the contact information is inputted by a user; in other embodiments, another individual may input a user's contact information on behalf of that contact. During its collection, the contact information may be verified by the individual inputting the contact information.

Collecting (220) proxy recipient information may include gathering from a sender information regarding the sender's proxy recipients for various message topics. In order to suggest an appropriate proxy recipient for the target recipient, the topic(s) of the message must be determined and correlated to a proxy recipient; the proxy recipient information provides a database to accomplish this correlation. The proxy recipient information may be collected by way of a target inputting one or more proxy recipient for each message topic; for example, a mathematician may list a peer as a proxy recipient for messages relating to the topic of calculus. Thus, a sender is still able to pose a calculus homework question to an individual (here, the peer) despite the unavailability of the target recipient. Proxy recipient information may also include the schedules of proxy recipients and/or the target recipient.

Determining (230) OOTO events may include analyzing the proxy recipient information and determining which target recipients and/or proxy recipients are out of the office at a given time. By enumerating all of the OOTO events, a sender may ensure that a message reaches an available recipient, and is not sent to a recipient who is unavailable, e.g. whose status is OOTO. In one embodiment, a target recipient has multiple proxy recipients listed in his proxy recipient information for a given topic such that the unavailability of the target and one of the target's proxy recipients does not prevent the message from being delivered to a third, available proxy recipient. OOTO events may be determined by analyzing calendar databases or determining that a user is unavailable as disclosed herein.

Figure 3:
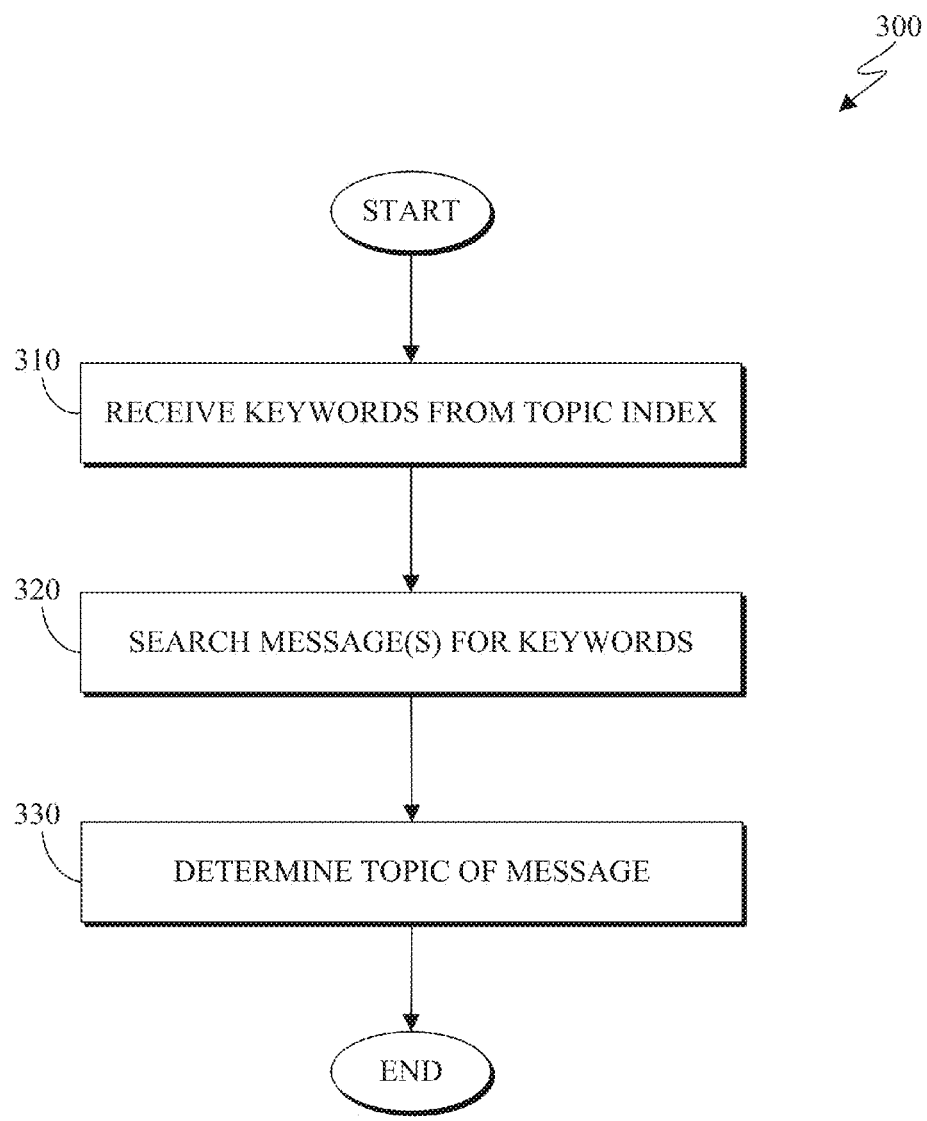
FIG. 3 is a flowchart of one embodiment of a method for determining topics in accordance with the present invention.

FIG. 3 is a flowchart of a computer-implemented topic determination method 300 in accordance with the subject invention. As depicted, the topic determination method 300 includes receiving (310) keywords from a topic index, searching (320) a message for keywords, and determining (330) the topic of a message. The topic determination method 300 ascertains one or more topics of a message, thus ensuring that any proxy recipients who are suggested are appropriate, given the subject area of the message.

Receiving (310) keywords from a topic index may include accessing a topic index in order to obtain a list of keywords. In some embodiments, the topic index that is accessed is a sender's own topic index; in other embodiments, topic indices belonging to one or more proxy recipients are accessed. In some embodiments, there is a public topic index that is accessible by all users and contains a global list of topics and keywords for all users. In certain embodiments, each user has a local copy of a global list of topics and keywords for all of the other users. Thus, the list of topics may be generated from a topic index that is local to the sender's messaging device, remote, or a combination thereof.

Searching (320) a message for keywords may include scanning a sender's message for the presence of the keywords obtained by the keyword receiving module 310. The body of the message may be searched, or the message title, or both.

Determining (330) the topic of a message may include assigning a topic to the message based on the presence of the keywords found in the message. In some embodiments, each keyword results in the assignment of a topic to the message; thus, a message with multiple keywords may span multiple topics in subject area. Statistical analysis of the presence of keywords may determine a ranked list of topics. For example, if a message mentions the keyword "TPS report" seven times, "dinner" three times, and "meeting" twice, the message topic determination module 330 may determine that the message's main topic is a TPS report, its secondary topic is dinner, and its tertiary topic is a meeting. Other techniques to analyze the content of a message by keywords, or the like, are well-known in the art and are likewise suitable to employ herein.

Figure 4:
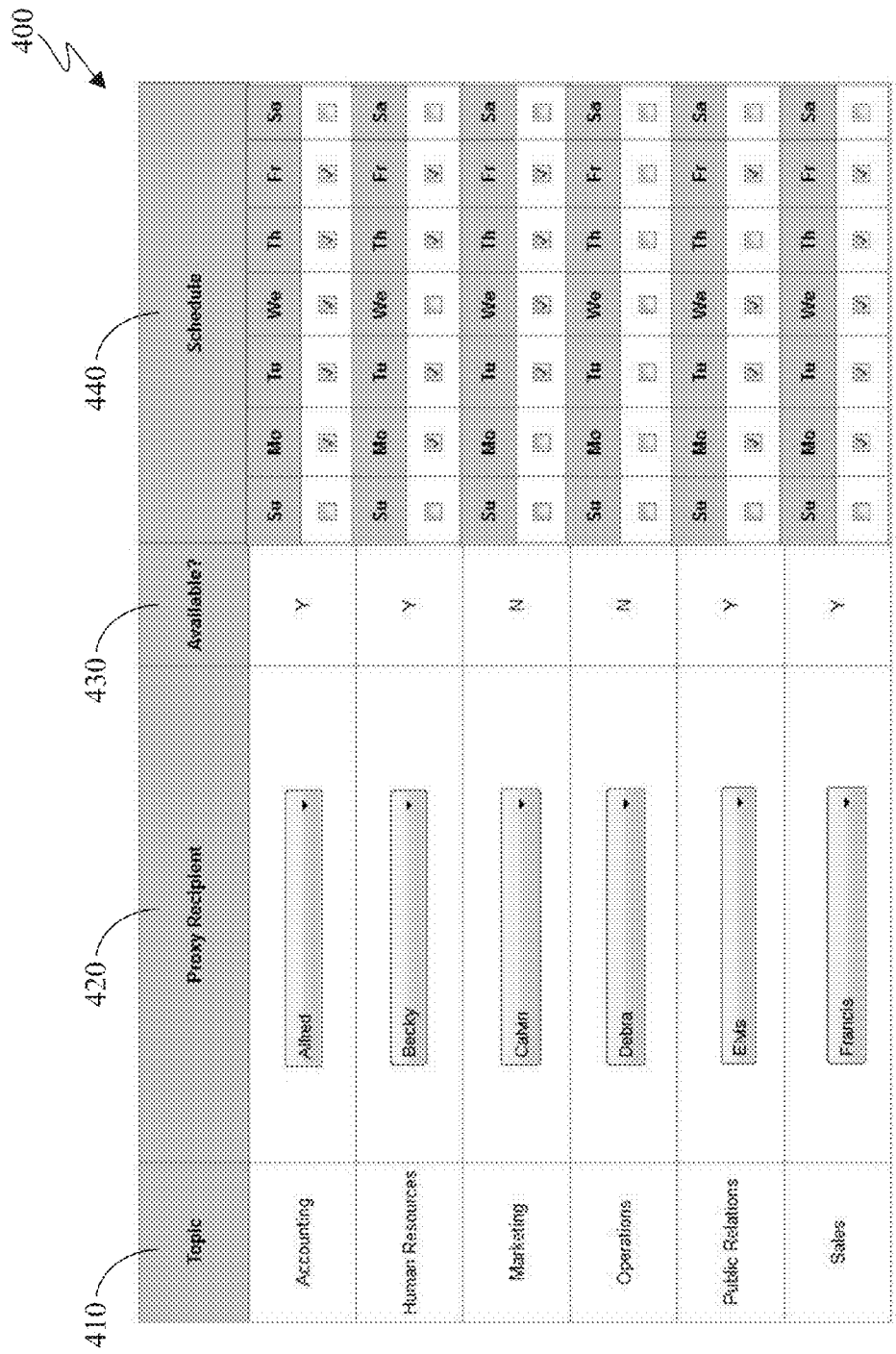
FIG. 4 is a user interface diagram depicting one example of an proxy recipient information interface in accordance with the present invention.

FIG. 4 is a user interface diagram depicting one example of proxy recipient information 400 in accordance with the present invention, including a list of topics 410 and corresponding proxy recipients 420, as well as the proxy recipients' availability 430 and schedule 440. The proxy recipient information 400 enables a user to access and edit the proxy recipient information as well as to provide additional information.

The proxy recipient information 400 is organized by topics 410 and corresponding proxy recipients 420. In one embodiment, there is one proxy recipient 420 per topic 410. In some embodiments, multiple proxy recipients may be provided for each topic 410. The topics 410 may include any subject of a message. As depicted, the topics 410 all relate to business departments; however, topics 410 are not limited to the business world, and any matter of discussion that a message might encompass is suitable as a topic 410. The proxy recipients 420 may include the one or more recipients who are assigned to a particular topic 410. In this depiction, "Alfred" is a proxy recipient for accounting topics, whereas "Becky" is a proxy recipient for human resource topics. In one embodiment, the proxy recipient 420 fields are menus that list the available proxy recipients by name, nickname, email address, phone number, or the like.

Availability 430 may include the current availability status of a proxy recipient. For example, if a proxy recipient sets her status to OOTO, she would not be listed as available. In one embodiment, a proxy recipient's availability 430 is determined by accessing the proxy recipient's calendar, or by other means previously disclosed herein. Availability may also be obtained by referring to a proxy recipient's schedule 440, which provides data about each proxy recipient's past, present, and future availability.

FIG. 5 is a user interface diagram depicting one example of a topic index 500 in accordance with the present invention, including a list of topics 410 and corresponding keywords 510. The topic index 500 enables a recipient or sender to associate each topic 410 with one or more keywords 510. A message may thus be determined to cover a particular topic via the keywords contained within the message. The keywords 510 may include any words that are associated with the corresponding topic 410. In some embodiments, the sender or recipient may customize their topics and keywords by adding additional topics and/or keywords.

A particular topic 410 may be linked to a message by the presence of one or more of its corresponding keywords 510. The presence of any of the keywords 510 for a topic 410 may implicate that topic; for example, if the keyword 510 "money" appears in the message, it may be determined that "accounting" is a topic 410 of that message. In some embodiments, a certain minimum number or percentage of keywords must appear before associating the message with that topic 410. If that is the case, "money" alone may not result in determining that "accounting" is a topic 410, but "money," combined with words like "payroll" and "budget" may meet certain predefined word frequency criteria to implicate the topic 410 of "accounting." Similarly, messages may be ranked by topic 410 depending on how many times each of their keywords 510 appear in the message.

Figure 6:
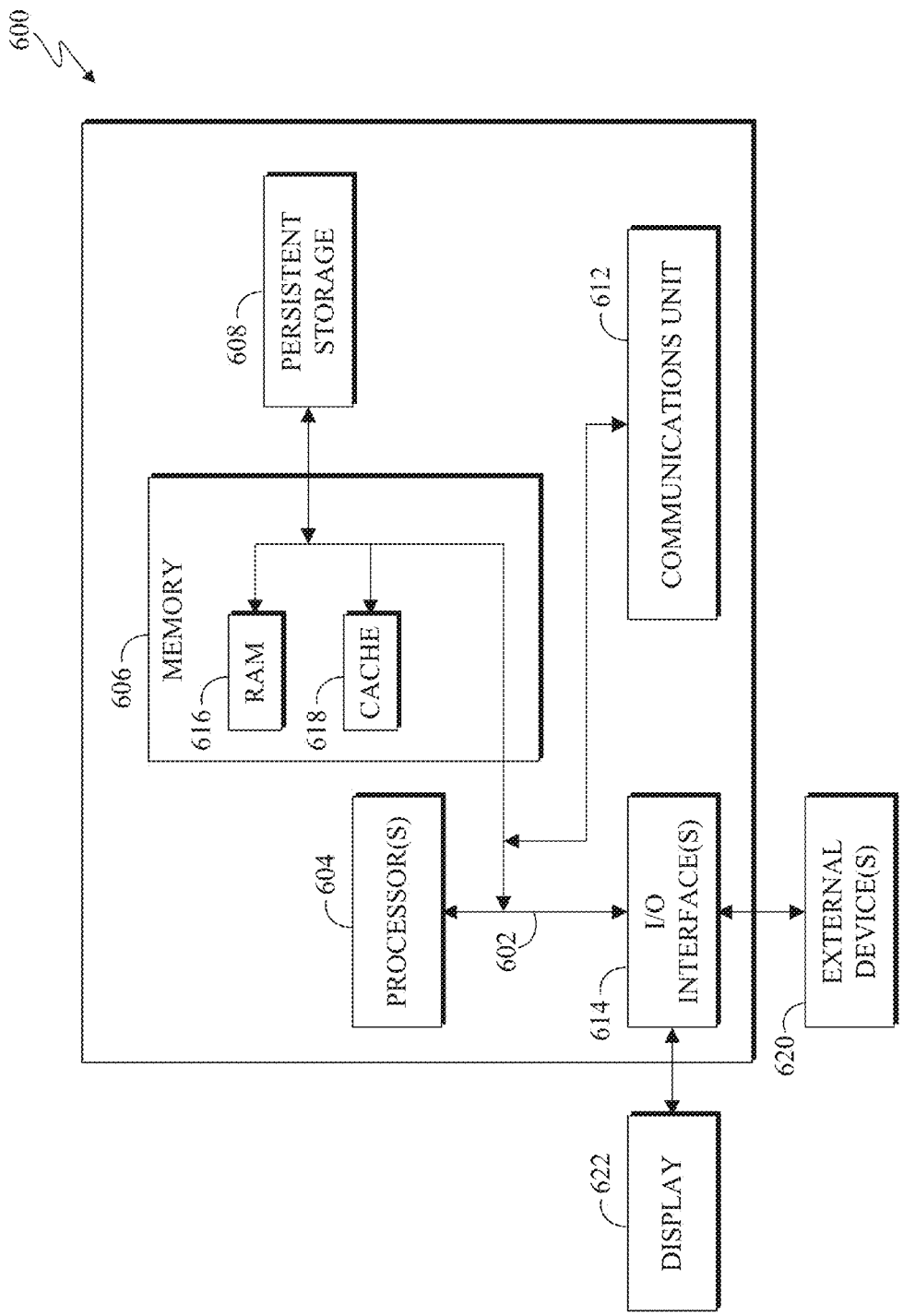
FIG. 6 is a block diagram depicting one example of a computing apparatus (i.e., computer) suitable for executing the methods disclosed herein.

The foregoing methods enable context-dependent message management. FIG. 6 is a block diagram depicting components of a computer 600 suitable for executing the methods disclosed herein. It should be appreciated that FIG. 6 provides only an illustration of one embodiment and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In the depicted embodiment, memory 606 includes random access memory (RAM) 616 and cache memory 618. In general, memory 606 can include any suitable volatile or non-volatile computer readable storage media.

One or more programs may be stored in persistent storage 608 for execution by one or more of the respective computer processors 604 via one or more memories of memory 606. The persistent storage 608 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 608 via I/O interface(s) 614. I/O interface(s) 614 may also connect to a display 622. Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer program product for messaging, the computer program product comprising:
   a computer readable storage medium and program instructions stored on the computer readable storage medium, the program instructions comprising instructions to:
   receive proxy recipient information from a target recipient;
   detect that a message is being drafted to the target recipient
   determine whether the target recipient is currently available without receiving a message from the target recipient; and
   in response to determining that the target recipient is currently unavailable, suggest a proxy recipient for the target recipient to a user.

2. The computer program product of claim 1, wherein the proxy recipient information identifies a plurality of proxy recipients for a corresponding plurality of topics.

3. The computer program product of claim 1, wherein the proxy recipient information specifies one or more topics for the target recipient.

4. The computer program product of claim 1, wherein the proxy recipient information is automatically determined.

5. The computer program product of claim 1, wherein the proxy recipient information is provided by the user.

6. The computer program product of claim 1, wherein the proxy recipient information comprises availability information.

7. The computer program product of claim 1, further comprising instructions to enable the user to approve the proxy recipient previous to transmitting the message.

8. The computer program product of claim 1, further comprising instructions to enable the target recipient to preemptively receive the message.

9. A computer system for messaging, the computer system comprising:
   one or more computer processors;
   one or more computer readable storage media;
   program instructions stored therein for execution by at least one of the one or more computer processors, the program instructions comprising instructions to:
   receive proxy recipient information from a target recipient;
   detect that a message is being drafted to the target recipient
   determine whether the target recipient is currently available without receiving a message from the target recipient; and
   in response to determining that the target recipient is currently unavailable, suggest a proxy recipient for the target recipient to a user.

10. The computer system of claim 9, wherein the proxy recipient information identifies a plurality of proxy recipients for a corresponding plurality of topics.

11. The computer system of claim 9, wherein the proxy recipient information comprises availability information.

12. The computer system of claim 9, further comprising instructions to enable the user to approve the proxy recipient previous to transmitting the message.

13. The computer system of claim 9, wherein the proxy recipient information specifies one or more topics for the target recipient.

14. The computer system of claim 9, wherein the proxy recipient information is automatically determined.

15. The computer system of claim 9, wherein the proxy recipient information is provided by the user.

16. The computer system of claim 9, further comprising instructions to enable the target recipient to preemptively receive the message.

* * * * *